(12) United States Patent
Lim

(10) Patent No.: US 7,667,804 B2
(45) Date of Patent: Feb. 23, 2010

(54) IN-PLANE SWITCHING MODE LIQUID CRYSTAL DISPLAY DEVICE

(75) Inventor: Young-Nam Lim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 372 days.

(21) Appl. No.: 11/476,921

(22) Filed: Jun. 29, 2006

(65) Prior Publication Data

US 2008/0204646 A1 Aug. 28, 2008

(30) Foreign Application Priority Data

Jun. 29, 2005 (KR) .................. 10-2005-0057346

(51) Int. Cl.
*G02F 1/1337* (2006.01)
(52) U.S. Cl. ...................... 349/126; 349/139
(58) Field of Classification Search .............. 349/56, 349/84, 122, 139, 167
See application file for complete search history.

(56) References Cited

U.S. PATENT DOCUMENTS

| | | | | |
|---|---|---|---|---|
| 3,947,184 A | * | 3/1976 | Saeva et al. | 349/25 |
| 3,957,344 A | * | 5/1976 | Saeva | 349/1 |
| 3,957,346 A | * | 5/1976 | Saeva | 349/98 |
| 3,957,347 A | * | 5/1976 | Saeva | 349/193 |
| 3,984,343 A | * | 10/1976 | Cole et al. | 349/179 |
| 4,083,797 A | * | 4/1978 | Oh | 252/299.64 |
| 5,382,688 A | * | 1/1995 | Nakayama et al. | 564/322 |
| 5,501,884 A | * | 3/1996 | Nakayama et al. | 428/1.26 |
| 5,781,265 A | * | 7/1998 | Lee | 349/171 |
| 5,805,253 A | * | 9/1998 | Mori et al. | 349/118 |
| 5,883,687 A | * | 3/1999 | Lu et al. | 349/201 |
| 5,959,707 A | * | 9/1999 | Murai et al. | 349/129 |
| 6,137,554 A | * | 10/2000 | Nakamura | 349/75 |
| 6,281,956 B1 | * | 8/2001 | Ohmuro et al. | 349/118 |
| 6,512,564 B1 | * | 1/2003 | Yoshida et al. | 349/124 |
| 6,600,538 B1 | * | 7/2003 | Shiomi et al. | 349/129 |
| 6,781,656 B2 | * | 8/2004 | Yoshida et al. | 349/124 |
| 7,030,555 B2 | * | 4/2006 | Nakamura et al. | 313/504 |

(Continued)

FOREIGN PATENT DOCUMENTS

DE 2406395 A * 8/1974

(Continued)

*Primary Examiner*—Frank G Font
*Assistant Examiner*—Peter Radkowski
(74) *Attorney, Agent, or Firm*—McKenna Long & Aldridge LLP (57) ABSTRACT

An in-plane switching (IPS) mode liquid crystal display (LCD) device, comprising: a first substrate and a second substrate; gate lines and data lines formed on the first substrate and crossing each other to form unit pixel regions; a switching device formed at each crossing of the gate lines and the data lines; at least one common electrode and pixel electrode arranged horizontally on the first substrate and generating a horizontal electric field; and a liquid crystal layer formed between the first substrate and the second substrate, wherein when a maximum voltage is applied to the at least one common electrode and pixel electrode, a maximum twist angle between liquid crystal molecules constituting the liquid crystal layer is about 90°. Also, the liquid crystal molecules forming the liquid crystal layer include a liquid crystal molecule having a positive dielectric anisotropy and a liquid crystal molecule having a negative dielectric anisotropy.

8 Claims, 6 Drawing Sheets

U.S. PATENT DOCUMENTS

| | | |
|---|---|---|
| 7,050,132 B2 * | 5/2006 | Okamoto et al. ............ 349/114 |
| 7,075,609 B2 * | 7/2006 | Ohmuro et al. ............. 349/130 |
| 7,133,099 B2 * | 11/2006 | Yoshida et al. ............. 349/129 |
| 2002/0036743 A1 * | 3/2002 | Youn et al. ................. 349/141 |
| 2003/0112394 A1 * | 6/2003 | Yoshida et al. ............. 349/123 |
| 2004/0160537 A1 * | 8/2004 | Okamoto et al. ............. 349/12 |
| 2004/0212296 A1 * | 10/2004 | Nakamura et al. .......... 313/504 |
| 2004/0233365 A1 * | 11/2004 | Yoshida et al. ............. 349/123 |
| 2005/0243245 A1 * | 11/2005 | Taguchi et al. ............... 349/96 |
| 2006/0093759 A1 * | 5/2006 | Fukagawa ................. 428/1.31 |
| 2006/0238696 A1 * | 10/2006 | Wen et al. .................. 349/187 |

FOREIGN PATENT DOCUMENTS

| | | | |
|---|---|---|---|
| JP | 51022678 A | * | 2/1976 |
| JP | 51022680 A | * | 2/1976 |
| JP | 53048987 A | * | 5/1978 |
| JP | 55048735 A | * | 4/1980 |
| JP | 62262826 A | * | 11/1987 |
| JP | 10053766 A | * | 2/1998 |
| JP | 11349945 A | * | 12/1999 |
| SU | 462855 A | * | 9/1975 |

* cited by examiner

IN-PLANE SWITCHING MODE LIQUID CRYSTAL DISPLAY DEVICE

This application claims the benefit of Korean Patent Application No. 2005-57346, filed on Jun. 29, 2005, which is hereby incorporated for all purposes as if fully set forth herein.

BACKGROUND OF THE INVENTION

1. Field of the Invention

The present invention relates to an in-plane switching (IPS) mode liquid crystal display (LCD) device, and more particularly, to an IPS-LCD device capable of improving a response speed by reducing a falling time of a liquid crystal molecule.

2. Discussion of the Related Art

Various portable electronic devices, such as mobile phones, personal digital assistant (PDA), and note book computers have been developed because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have also been developed. Of these flat panel display devices, LCDs are currently mass produced because of their simple driving scheme and superior image quality.

The LCD device is a display device for displaying a desired image by independently supplying a data signal to pixels arranged in a matrix form according to image information and thus controlling an optical transmittance of each of the pixels. The LCD device is mainly driven by an active matrix (AM) method. The active matrix method serves to drive a liquid crystal molecule by applying a voltage to the liquid crystal molecule through a switching device such as a thin film transistor (TFT) provided at each pixel.

The LCD device can be classified into various types based upon a method in which the liquid crystal molecules are driven. An LCD device of a twisted nematic (TN) mode has been mainly used among the various LCD devices.

The TN-mode LCD device drives liquid crystal molecules in a direction perpendicular to a substrate by turning on/off an electric field so that a director of the liquid crystal molecules can have an angle of 0°~90° in relation to the substrate. Accordingly, a black/white mode is easily displayed, a fast response is implemented, and a low driving voltage is required.

However, since the TN-mode LCD device drives liquid crystal molecules in a direction perpendicular to a substrate, a narrow viewing angle is obtained. As a result, a color or a brightness of an image is varied according to an arrangement direction or an arrangement angle of the LCD device. In order to solve the problem, an in-plane switching (IPS) mode LCD device for implementing a wide viewing angle, that is, an in-plane electric field applied to a substrate in a horizontal direction, and for driving liquid crystal molecules under a state that a director of the liquid crystal molecules is horizontal to a substrate along the electric field direction has been proposed.

Figure 1:
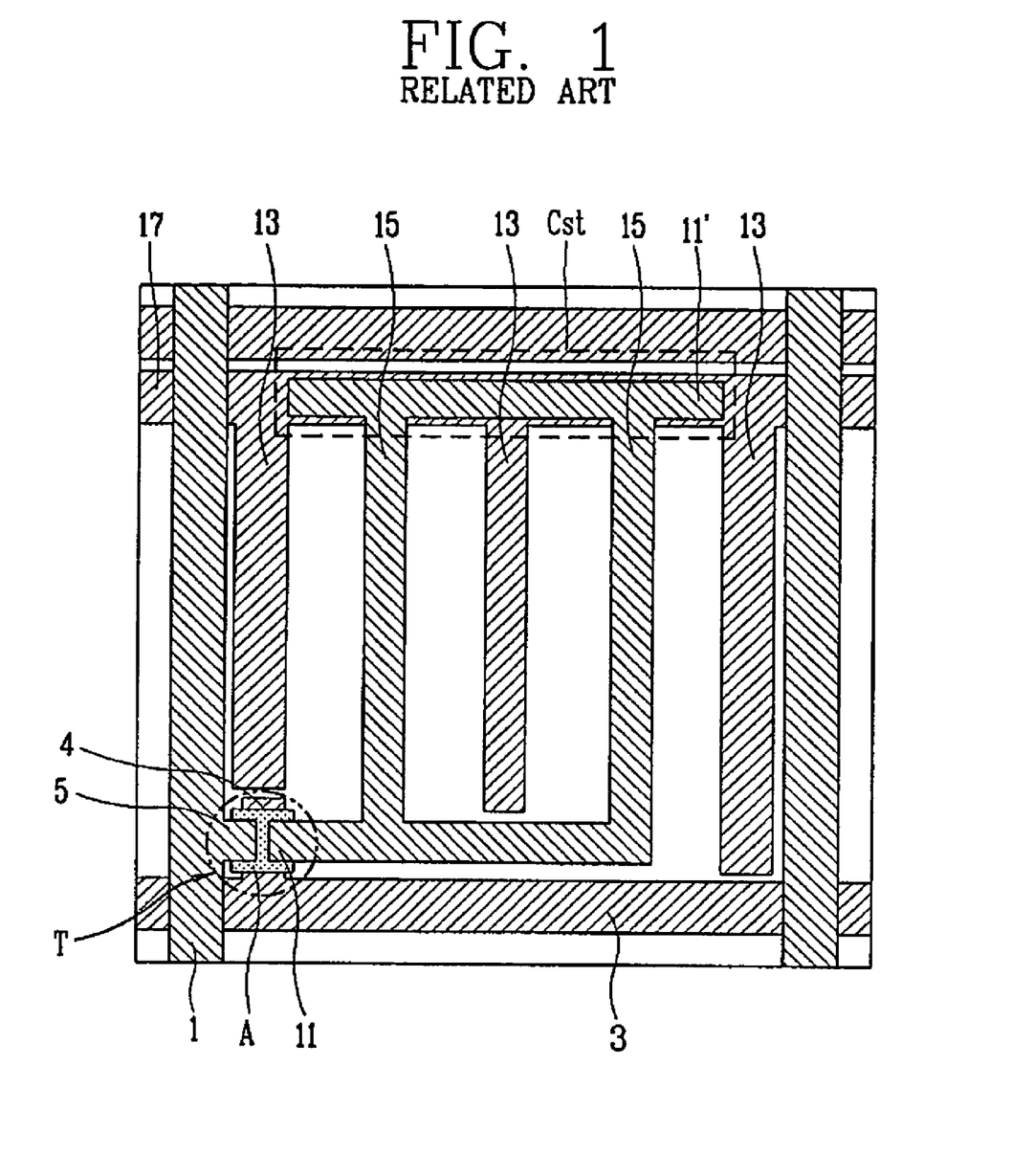
FIG. 1 is a plan view showing an in-plane switching (IPS) mode liquid crystal display (LCD) device in accordance with the related art.

FIG. 1 is a plan view showing a unit pixel of an IPS-LCD device in accordance with the related art. As shown, a gate line 3 and a data line 1 are arranged on a first substrate of an IPS-LCD device in horizontal and vertical directions, respectively, thereby defining a unit pixel. A switching device (T) is formed at a crossing of the data line 1 and the gate line 3. Also, a common electrode 13 and a pixel electrode 15 are formed in the pixel region in parallel with the data line 1.

The switching device T comprises a gate electrode 4 connected to the gate line 3; a gate insulating layer (not shown) deposited on the gate electrode 4 and formed of SiNx or SiOx; a semiconductor layer A formed on the gate insulating layer; an ohmic-contact layer (not shown) formed on the semiconductor layer A; and a source electrode 5 and a drain electrode 11 formed on the ohmic-contact layer, and connected to the data line 1 and the pixel electrode 15, respectively.

The common electrode 13 is connected to a common line 17 for transmitting a common signal, and the pixel electrode 15 is connected to the drain electrode 11 of the thin film transistor T.

A passivation layer (not shown) formed of an inorganic insulating material or an organic insulating material is deposited on the entire substrate including the pixel electrode 15 and the gate insulating layer, and a first alignment layer (not shown) is deposited on the passivation layer. An initial alignment direction of a liquid crystal molecule is determined according to a rubbing direction of the first alignment layer. When a voltage is not applied to the common electrode 13 and the pixel electrode 15, the liquid crystal molecule is aligned along the rubbing direction of the first alignment layer.

Although not shown, a shielding layer for preventing an optical leakage, a color filter for implementing R, G, and B colors, and an overcoat layer are sequentially deposited on a second substrate corresponding to the first substrate. Also, a second alignment layer having the same rubbing direction as the first alignment layer is deposited on the overcoat layer.

A liquid crystal layer for controlling an optical transmittance by a voltage applied to the common electrode 13 and the pixel electrode 15 is formed between the first substrate and the second substrate.

Figure 2A:
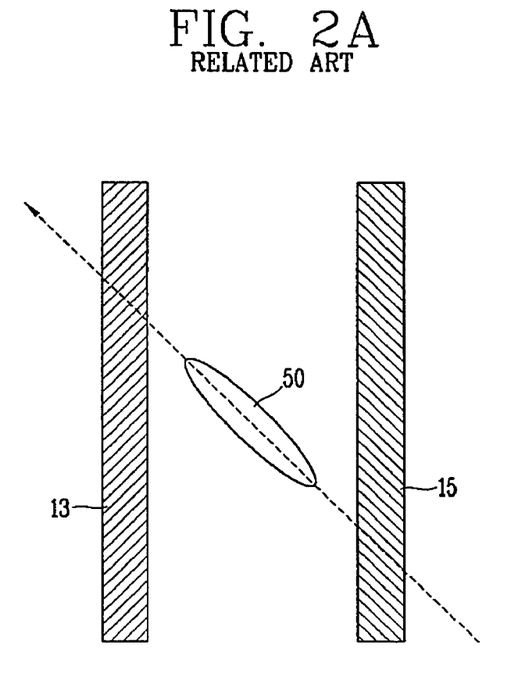
FIGS. 2A and 2B are plan views showing a driving state of the IPS-LCD device.
Figure 2B:
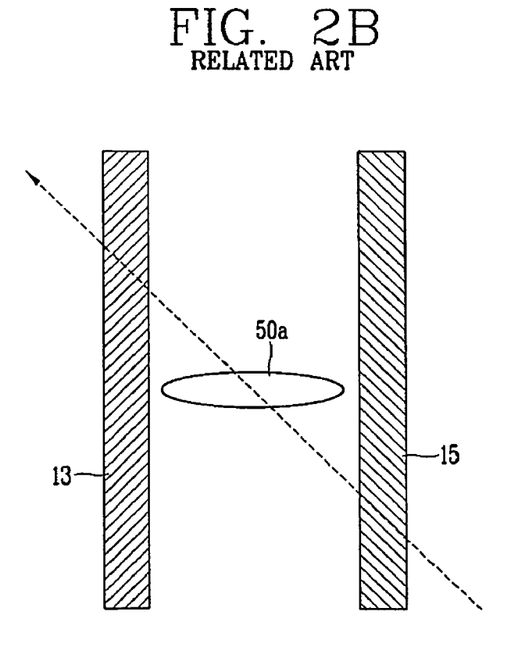

FIGS. 2A and 2B show an operation of the IPS-LCD device, in which FIG. 2A shows a driving state of a liquid crystal molecule 50 when a voltage is not applied between the common electrode 13 and the pixel electrode 15, and FIG. 2B shows a driving state of the liquid crystal molecule 50 when a voltage is applied therebetween.

As shown in FIG. 2A, when a voltage is not applied between the two electrodes 13 and 15 of the IPS-LCD device, the liquid crystal molecule 50 inside the liquid crystal layer is aligned along the rubbing direction of the first and second alignment layers deposited on facing surfaces of the first and second substrates (the arrow direction of the dotted line in drawing). As the result, a normally black mode is displayed.

As shown in FIG. 2B, when a voltage is applied between the two electrodes 13 and 15 of the IPS-LCD device, a horizontal electric field is generated therebetween. The liquid crystal molecule 50a is twisted by a maximum angle of 45° thereby to transmit light.

When a voltage is applied to the common electrode 13 and the pixel electrode 15, a horizontal electric field parallel with the substrate is generated between the common electrode 13 and the pixel electrode 15. Accordingly, the liquid crystal molecule is aligned in a parallel state with the substrate along the horizontal electric field, thereby having a viewing angle wider than that of the related art TN LCD device.

However, the IPS-LCD device has a response speed slower than that of the related art TN-LCD device, thereby having a difficulty in processing a moving image. In order to solve the problem, several methods for accelerating a response speed of a liquid crystal molecule have been proposed. One of the methods is to easily displace the liquid crystal molecule against a torque applied from an electric field by lowering a viscosity of the liquid crystal molecule.

That is, in the IPS-LCD device, an elastic torque of the liquid crystal molecule is much lowered than an electric torque of the liquid crystal molecule by degrading a viscosity of the liquid crystal molecule. As the result, each driving speed of the liquid crystal molecule is accelerated by the lowering of the elastic torque when the electric torque is constant.

However, since the elastic torque of the liquid crystal molecule is lowered, a falling time of the liquid crystal molecule is increased in an off state field. That is, the decrease of the viscosity of the liquid crystal molecule causes a decrease of a restoration force of the liquid crystal molecule to return to the initial position from a distorted state, thereby increasing the falling time of the liquid crystal molecule.

In order to improve the response speed of the liquid crystal molecule, both a rising time taken for the liquid crystal molecule to be distorted by an electric field and a falling time taken for the liquid crystal molecule to be restored to the initial position have to be considered. Therefore, the entire response speed of the liquid crystal molecule can not be sufficiently improved only by the lowering of the viscosity of the liquid crystal molecule.

SUMMARY OF THE INVENTION

Accordingly, the present invention is directed to an in-plane switching mode liquid crystal display device that substantially obviates one or more of the problems due to limitations and disadvantages of the related art.

An advantage of the present invention is to provide an IPS-LCD device capable of implementing a fast response by reducing a falling time of liquid crystal molecule.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided an IPS-LCD device, comprising a first substrate and a second substrate; gate lines and data lines formed on the first substrate and crossing each other to form unit pixel regions; a switching device formed at each crossing of the gate lines and the data lines; at least one common electrode and pixel electrode horizontally arranged on the first substrate and generating a horizontal electric field; and a liquid crystal layer formed between the first substrate and the second substrate wherein when a maximum voltage is applied to the common electrode and the pixel electrode, a liquid crystal molecule of the liquid crystal layer has a maximum twist angle of about 90°. The liquid crystal molecule of the liquid crystal layer includes a liquid crystal molecule having a positive dielectric anisotropy and a liquid crystal molecule having a negative dielectric anisotropy.

In another aspect of the present invention an in-plane switching (IPS) mode liquid crystal display (LCD) device includes a first substrate and a second substrate; gate lines and data lines formed on the first substrate and crossing each other to form unit pixel regions; a switching device formed at each crossing of the gate lines and the data lines; at least one common electrode and pixel electrode arranged horizontally on the first substrate and generating a horizontal electric field; and a liquid crystal layer formed between the first substrate and the second substrate, the liquid crystal layer including a liquid crystal having a positive dielectric anisotropy and a liquid crystal molecule having a negative dielectric anisotropy, wherein when a maximum voltage is applied to the at least one common electrode and pixel electrode, a maximum twist angle of the liquid crystal molecules of the liquid crystal layer is about 90°.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

A response speed of a liquid crystal molecule constituting a liquid crystal layer of a liquid crystal display (LCD) device is determined by the sum of a rising time (Tr) and a falling time (Tf). The rising time denotes a time taken for a liquid crystal molecule to be distorted according to a direction of a generated electric field. Also, the falling time denotes a time required for the liquid crystal molecule to return to the initial position when the generated electric field is removed.

That is, the response speed of the LCD device is determined by the sum of a rising time (Tr) taken when a normally black mode is converted to a normally white mode, and a falling time taken when a normally white mode is converted to a normally black mode.

$Tr = \gamma / \{\Delta\epsilon(V^{2-Vo2})\}$ [Equation 1]

$Tf = d2*\gamma / (\pi^2 * K)$ [Equation 2]

$T = Tr + Tf$ [Equation 3]

Herein, the V denotes a voltage applied to an electrode, Vo denotes a threshold voltage, the d denotes a cell gap of two substrates, $\gamma$ denotes an average viscosity of a liquid crystal molecule, the $\Delta\epsilon$ denotes a dielectric anisotropy of the liquid crystal molecule, and the K denotes a twist elastic constant of the liquid crystal molecule.

Generally, the elastic constant of the liquid crystal molecule includes not only a twist elastic constant but also a spray elastic constant and a bend elastic constant. However, in the IPS-LCD device, the spray elastic constant and the bend elastic constant are very small values when compared with the twist elastic contact. Accordingly, in the present invention, the elastic constant refers to the twist elastic constant.

The rising time Tr and the falling time Tf shown in the equations 1 and 2 can be controlled by several factors.

As shown in Equations 1 and 2, the rising time can be decreased by decreasing the viscosity of the liquid crystal molecule, decreasing the cell gap between two substrates, increasing the dielectric anisotropy of the liquid crystal molecule, and increasing the voltage. Also, the falling time can be decreased by decreasing the viscosity of the liquid crystal molecule, increasing the twist elastic constant, and decreasing the cell gap between two substrates regardless of the voltage.

The present invention provides an LCD device having an improved response speed. To this end, an elastic constant of a liquid crystal molecule constituting a liquid crystal layer of the LCD device is increased thus to increase an elastic force of the liquid crystal molecule, thereby minimizing a falling time of the liquid crystal molecule.

Hereinafter, an IPS-LCD device according to the present invention will be explained in more detail with reference to the attached drawings.

Figure 3A:
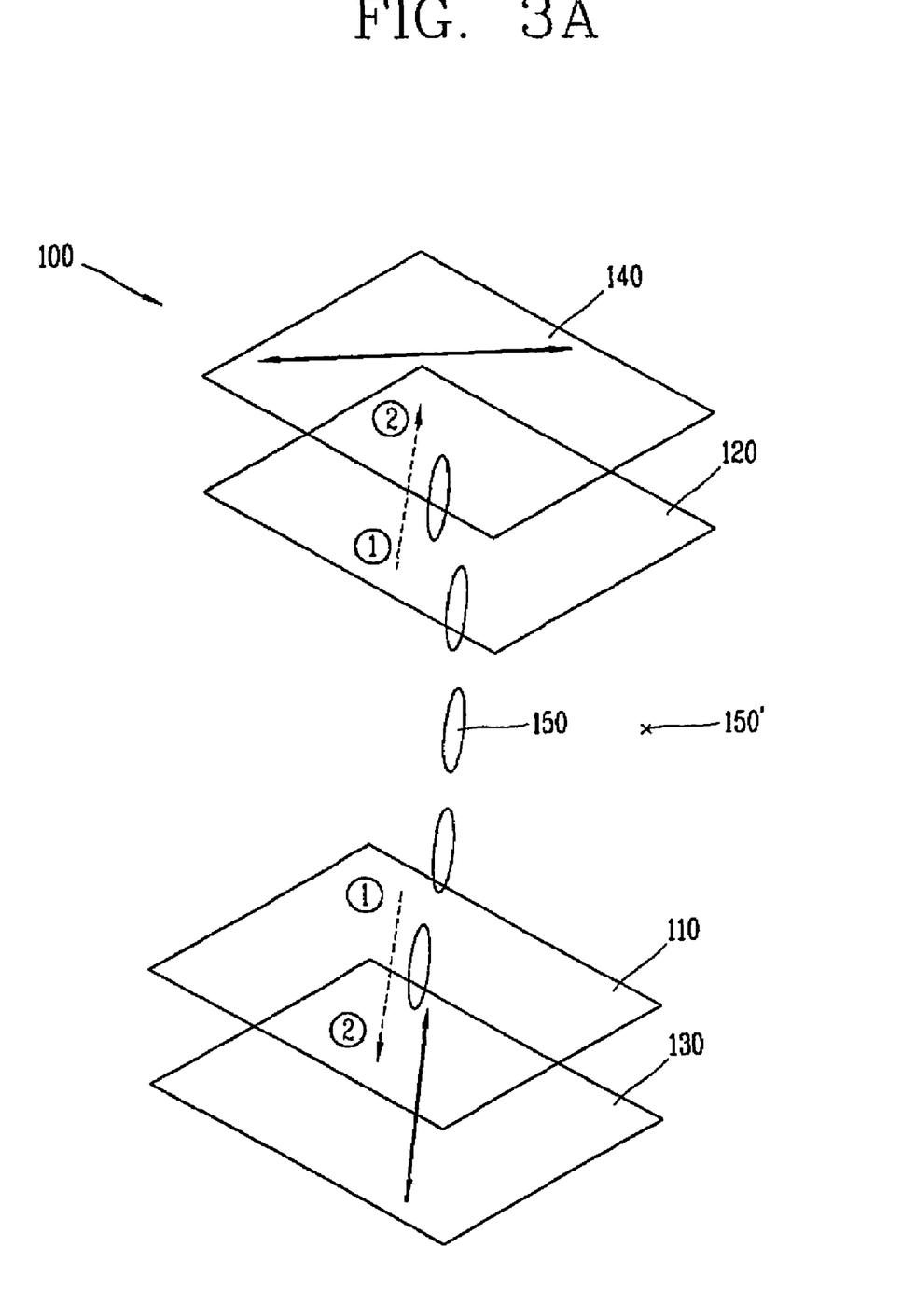
FIGS. 3A and 3B are schematic views showing an IPS-LCD device according to an embodiment of the present invention.
Figure 3B:
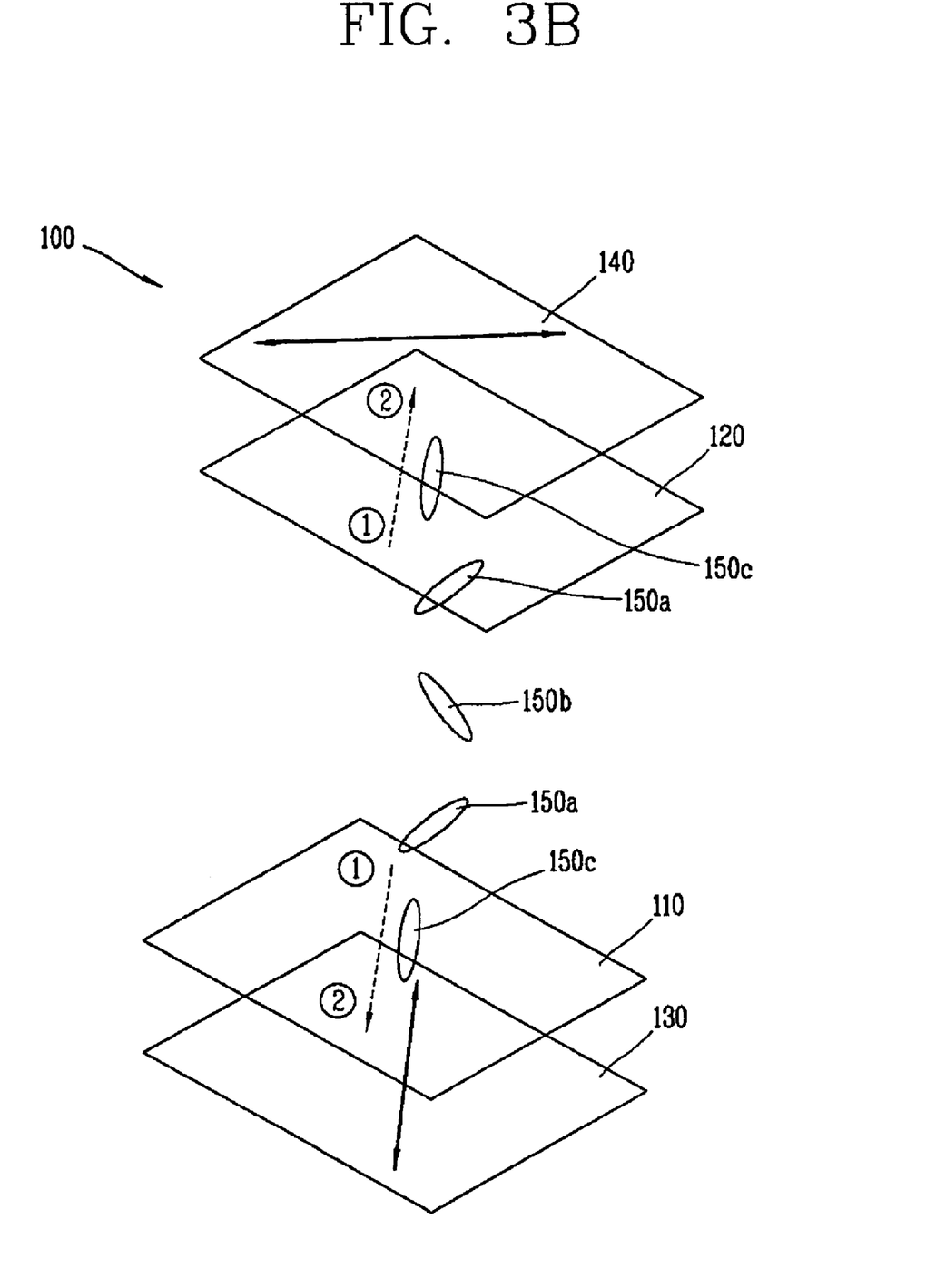

FIG. 3A is a schematic view showing an alignment state of a liquid crystal molecule constituting a liquid crystal layer when an electric field is not applied, and FIG. 3B is a schematic view showing an alignment state of a liquid crystal molecule when an electric field is applied to the IPS-LCD device according to the present invention.

As shown, the IPS-LCD device 100 comprises a first substrate 110 that is a thin film transistor array substrate, a second substrate 120 that is a color filter substrate, and a liquid crystal layer 150' formed between the first substrate 110 and the second substrate 120. A common electrode and a pixel electrode (not shown are formed in a unit pixel region of the first substrate 110, thereby generating a horizontal electric field. The liquid crystal molecule 150 constituting the liquid crystal layer 150' includes a liquid crystal molecule 150 having a positive dielectric anisotropy 150a and a liquid crystal molecule having a negative dielectric anisotropy 150b. A first polarizer 130 and a second polarizer 140 are provided at upper and lower portions of the first substrate 110 and the second substrate 120, respectively. Although not shown, a first alignment layer and a second alignment layer for determining an initial alignment of the liquid crystal molecule 150 constituting the liquid crystal layer 150' are formed at each facing surface of the first substrate 110 and the second substrate 120.

The solid lines in FIGS. 3A and 3B indicate each polarization direction of the first polarizer 130 and the second polarizer 140, and the dotted lines indicate each rubbing direction of the first alignment layer and the second alignment layer. The first substrate 110 and the second substrate 120 have the same rubbing direction, and the polarization direction of the first polarizer 130 is equal to the rubbing direction. Also, the polarization direction of the second polarizer 140 is substantially perpendicular to the polarization direction of the first polarizer 130. The ① indicates a rubbing starting point, and ② indicates a rubbing ending point.

The common electrode and the pixel electrode are formed to have an inclined angle of about 45° from the rubbing direction, so that a direction of a horizontal electric field generated by the common electrode and the pixel electrode is inclined by about 45° from the rubbing direction.

When a voltage is not applied to the IPS-LCD device 100 of the present invention, as shown in FIG. 3A, the liquid crystal molecule 150 is arranged along the rubbing direction. Accordingly, light incident from a backlight passes through the first polarizer 130 and the liquid crystal layer 150', but is shielded by the second polarizer 140, thereby displaying a normally black mode.

On the contrary, when a voltage is applied to the IPS-LCD device 100, as shown in FIG. 3B, a horizontal electric field is generated between the pixel electrode and the common electrode. Also, the liquid crystal molecules 150a and 150b inside the liquid crystal layer 150' except the liquid crystal molecule 150c are driven in the horizontal electric field direction.

However, since the liquid crystal molecule 150 of the liquid crystal layer 150' includes a liquid crystal molecule having a positive dielectric anisotropy 150a and a liquid crystal molecule having a negative dielectric anisotropy 150b, the liquid crystal molecules 150a and 150b are aligned in different directions. Accordingly, a twist angle between the adjacent liquid crystal molecules 150a and 150b is increased, which increases an effective elastic constant of the liquid crystal molecules 150a and 150b. Thus, a falling time of the IPS-LCD device 100 is decreased.

Figure 4A:
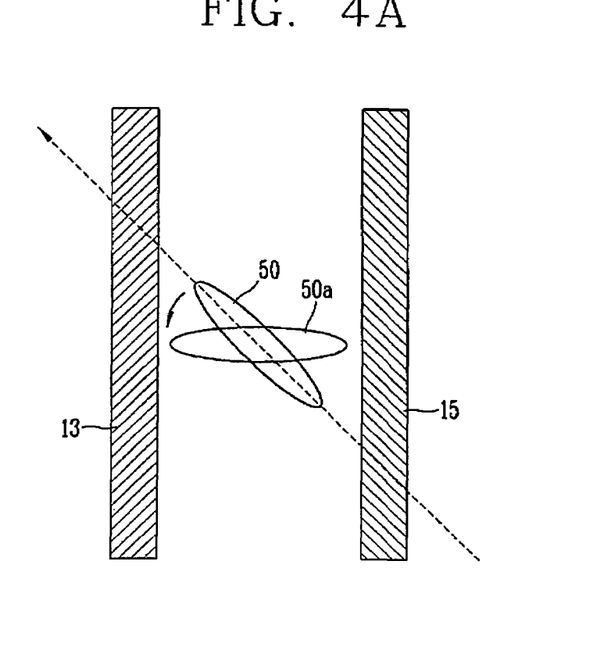
FIGS. 4A and 4B are plan views showing each driving state of the IPS-LCD device according to the related art and the present invention.
Figure 4B:
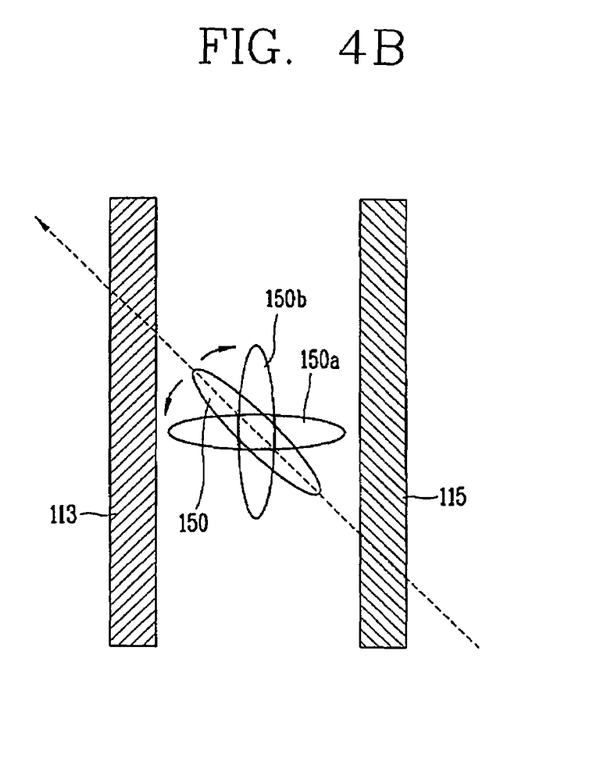

FIG. 4A shows a unit pixel region of the related IPS-LCD device and FIG. 4B shows a unit pixel region of an IPS-LCD device according to the present invention, which respectively shows each driving state of a liquid crystal molecule when a voltage is applied to a common electrode and a pixel electrode and when a voltage is not applied thereto.

As shown in FIG. 4A, when a voltage is not applied between the common electrode 13 and the pixel electrode 15 of the related IPS-LCD device, the liquid crystal molecule 50 inside the liquid crystal layer is aligned along the rubbing direction (the arrow direction of the dotted line), thereby displaying a normally black mode. However, when a voltage is applied between the common electrode 13 and the pixel electrode 15, a horizontal electric field is generated therebetween and thus the liquid crystal molecule 50a is twisted by a maximum angle of about 45° (the arrow direction of the solid line) to transmit light.

As shown in FIG. 4B, when a voltage is not applied to the common electrode 113 and the pixel electrode 115 of the IPS-LCD device according to the present invention, the liquid crystal molecule 150 is aligned along the rubbing direction (the arrow direction of the dotted line); thereby displaying a normally black mode. However, when a voltage is applied to the common electrode 113 and the pixel electrode 115, the liquid crystal molecule having a positive dielectric anisotropy 150a is transformed substantially parallel with the horizontal electric field (the arrow direction of the solid line in drawing ↙), and the liquid crystal molecule having a negative dielectric anisotropy 150b is transformed substantially perpendicular to the horizontal electric field (the arrow direction of the solid line in drawing ↗). As a result, a maximum twist angle between the liquid crystal molecule having a positive dielectric anisotropy 150a and the liquid crystal molecule having a negative dielectric anisotropy 150b is about 90°, which is twice the maximum twist angle of about 45° of the related art. The increase of the twist angle between the liquid crystal molecule having a positive dielectric anisotropy 150a and the liquid crystal molecule having a negative dielectric anisotropy 150b increases the effective elastic constant therebetween.

The following equation 4 shows that the effective elastic constant between the liquid crystal molecule having a positive dielectric anisotropy 150a and the liquid crystal molecule having a negative dielectric anisotropy 150b is proportional to the twist angle therebetween.

$$K' \propto K \times \theta \qquad \text{[Equation 4]}$$

Herein, K denotes an elastic constant of a liquid crystal molecule, the θ denotes a twist angle of adjacent liquid crystal molecules, and the K' denotes an effective elastic constant of the liquid crystal molecule.

The increase of the effective elastic constant of the liquid crystal molecule means a substantial increase of an elastic force, which causes an increase of a restoration force to the initial position of the liquid crystal molecule.

The increase of the restoration force of the liquid crystal molecule shortens the falling time of the liquid crystal molecule, thereby implementing a fast response in the LCD device.

Figure 5:
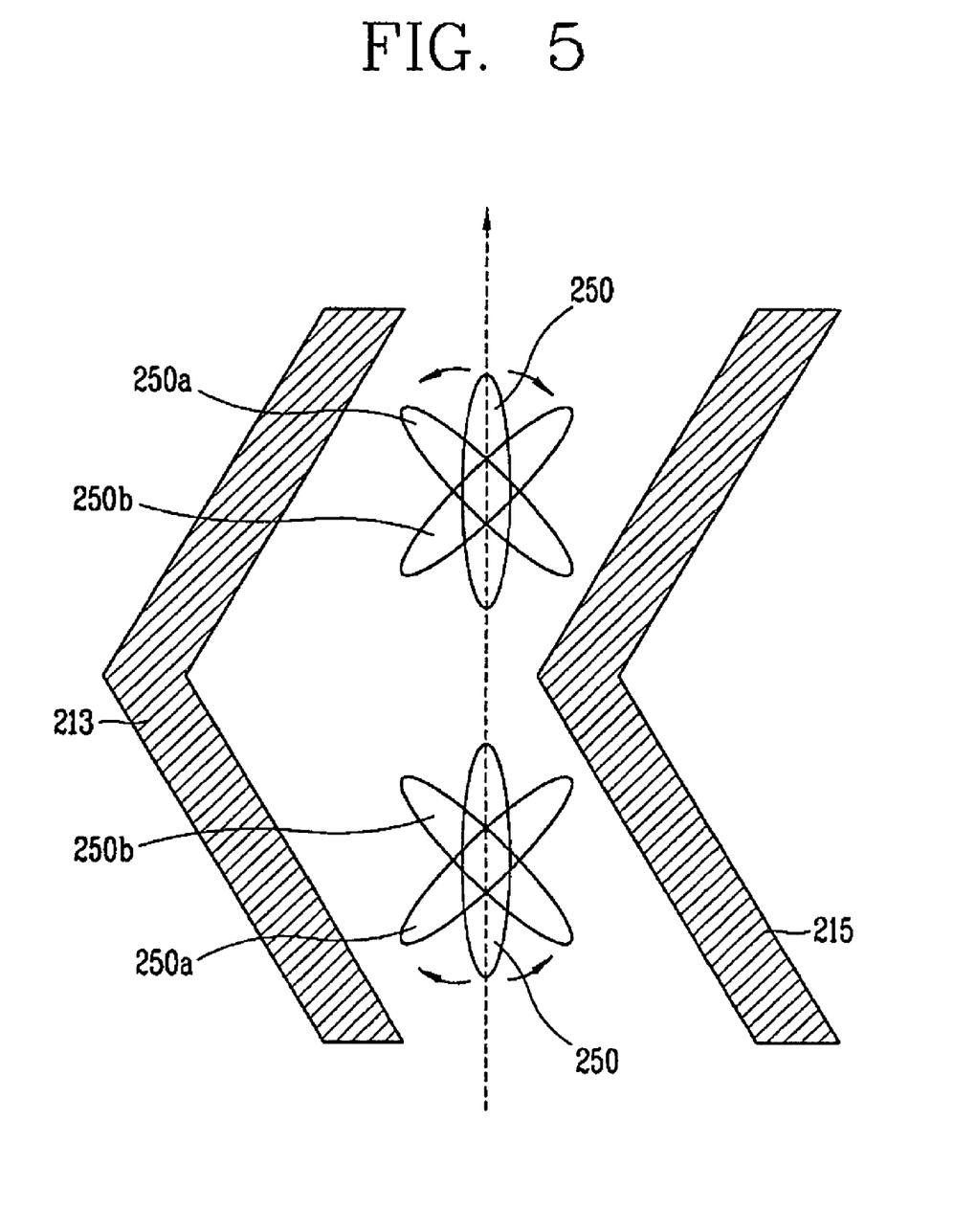
FIG. 5 is a plan view showing a unit pixel region of an IPS-LCD device according to another embodiment of the present invention.

FIG. 5 is a plan view showing a unit pixel region of an IPS-LCD device according to another embodiment of the present invention. In FIG. 5, a common electrode 213 and a pixel electrode 215, to which a voltage is applied, are formed to have a bent portion in a unit pixel region. Also, a rubbing direction of an alignment layer (the arrow direction of the dotted line in drawing ↑) is inclined by about 45° from the common electrode 213 and the pixel electrode 215 so as to correspond to the horizontal electric field generated by the common electrode 113 and the pixel electrode 215. Herein, the common electrode 213 and the pixel electrode 215 can be formed to have a bent portion with an inclined angle of about 0°~45° from an extended direction of the data line in the unit pixel region. Herein, the rubbing direction is inclined by about 450 from the common electrode and the pixel electrode.

In this case, a voltage is applied to the common electrode 213 and the pixel electrode 215. Also, a liquid crystal molecule 250a having a positive dielectric anisotropy is twisted substantially parallel to the horizontal electric field, and a liquid crystal molecule 250b having a negative dielectric anisotropy is twisted in a direction substantially perpendicular to the horizontal electric field, thereby transmitting light. When a maximum voltage is applied to the common electrode 213 and the pixel electrode 215, a maximum twist angle between the liquid crystal molecules 250a and 250b is about 90° and an operation margin therebetween is increased. As a result, an elastic force of the liquid crystal molecule to restore to the initial position is increased.

In the present invention, the rubbing direction has an inclined angle of about 45° from the common electrode and the pixel electrode. However, the inclined angle is not limited to the 45° but can be any angle according to a direction that the common electrode and the pixel electrode are formed.

Although not shown, on the first substrate of the IPS-LCD device, gate lines and data lines formed of a metal layer are arranged in horizontal and vertical directions to form each unit pixel region. A switching device, such as a thin film transistor composed of a gate electrode, a semiconductor layer, and source/drain electrodes, is formed at each crossing of the gate and data lines. The gate electrode is connected to the gate lines, and the source/drain electrodes are connected to the data lines. The switching device is turned on by a signal input through the gate lines, and an image signal applied to the switching device through the data line is transmitted to the pixel. In the pixel region, a common line for transmitting a common signal is arranged to be substantially parallel to the gate line. The common electrode is simultaneously formed with the gate line thus to be connected to the common line. Also, the pixel electrode is simultaneously formed with the source/drain electrodes thus to be connected to the drain electrode of the switching device. A pixel electrode line for electrically connecting the plurality of pixel electrodes is overlapped with the common line under a state that a gate insulating layer is formed therebetween, thereby forming a storage capacitor (Cst).

A shielding layer for preventing an optical leakage, a color filter for implementing R, G, and B colors, and an overcoat layer are sequentially deposited on a second substrate corresponding to the first substrate. The color filter can be formed on the first substrate.

As aforementioned, in the present invention, the liquid crystal molecule constituting the liquid crystal layer is composed of a liquid crystal molecule having a positive dielectric anisotropy and a liquid crystal molecule having a negative dielectric anisotropy. Accordingly, the effective elastic constant between the liquid crystal molecules is increased, and the falling time required for the liquid crystal molecule to return to an initial position is shortened, thereby improving the response speed of the LCD device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-plane switching (IPS) mode liquid crystal display (LCD) device, comprising:

a first substrate and a second substrate;

gate lines and data lines formed on the first substrate and crossing each other to form unit pixel regions;

first and second alignment layers over the first and second substrates, the first and second alignment layers being rubbed in the same rubbing direction;

a switching device formed at each crossing of the gate lines and the data lines;

at least one common electrode and pixel electrode arranged horizontally on the first substrate and generating a horizontal electric field, the common electrode and the pixel electrode being extended in the predetermined angle from the rubbing direction of the alignment layers in the first and second substrate;

a liquid crystal layer formed between the first substrate and the second substrate, the liquid crystal layer including liquid crystal molecules having a positive dielectric anisotropy and liquid crystal molecules having a negative dielectric anisotropy; and a first polarizer and a second polarizer attached respectively at the first substrate and the second substrate, the first polarizer having a first polarizing direction parallel to the rubbing direction of the alignment layers in the first and second substrate and the second polarizer having a second polarizing direction perpendicular to the first polarizing direction of the first alignment layer, wherein when a voltage is not applied to the common electrode and pixel electrode, the liquid crystal molecules having the positive dielectric anisotropy and the liquid crystal molecules having the negative dielectric anisotropy are aligned along the rubbing direction of the alignment layer, and when the voltage is applied to the common electrode and pixel electrode, the liquid crystal molecules having the positive dielectric anisotropy and the liquid crystal molecules having the negative dielectric anisotropy are switching by the horizontal electric field so that the liquid crystal molecules having the positive dielectric anisotropy are aligned in the direction parallel to the horizontal electric field and the liquid crystal molecules having the negative dielectric anisotropy are aligned in the direction perpendicular to the horizontal electric field, wherein the liquid crystal molecules having the positive dielectric anisotropy are rotated in the different rotating direction from that of the liquid crystal molecules having the negative dielectric anisotropy.

2. The IPS-LCD device of claim 1, wherein the maximum twist angle between the liquid crystal molecule having a positive dielectric anisotropy and the liquid crystal molecule having a negative dielectric anisotropy is about 90° when the maximum voltage is applied to the common electrode and pixel electrode.

3. The IPS-LCD device of claim 1, further comprising first and second alignment layers having a same rubbing direction and formed at each facing surface of the first and second substrates.

4. The IPS-LCD device of claim 3, wherein the common electrode and the pixel electrode are formed to be substantially parallel to the data line.

5. The IPS-LCD device of claim 4, wherein the rubbing direction has an inclined angle of about 45° with respect to the common electrode and the pixel electrode.

6. The IPS-LCD device of claim 3, wherein the common electrode and the pixel electrode are formed to have a bent portion with an inclined angle of about 0°~45° from an extended direction of the data line in the unit pixel region.

7. The IPS-LCD device of claim 6, wherein the rubbing direction has an inclined angle of about 45° with respect to the common electrode and the pixel electrode.

8. The IPS-LCD device of claim 1, further comprising:
a color filter formed on the second substrate; and
a light shielding layer formed on the second substrate.

* * * * *